(12) United States Patent
Wisnudel et al.

(10) Patent No.: US 6,925,051 B2
(45) Date of Patent: *Aug. 2, 2005

(54) LIMITED PLAY DATA STORAGE MEDIA AND ASSOCIATED METHODS OF MANUFACTURE

(75) Inventors: Marc Brian Wisnudel, Clifton Park, NY (US); Kathryn Lynn Longley, Saratoga Springs, NY (US); Daniel Robert Olson, Voorheesville, NY (US); Jan Pleun Lens, Breda (NL); Edward Paul Lindholm, Brookline, MA (US)

(73) Assignee: General Electric Company, Schenectady, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/633,473

(22) Filed: Aug. 1, 2003

(65) Prior Publication Data

US 2005/0025988 A1 Feb. 3, 2005

(51) Int. Cl.[7] ................................................. G11B 7/26
(52) U.S. Cl. ................. 369/286; 430/270.11; 428/64.8; 428/64.4
(58) Field of Search .............................. 428/64.8, 64.4; 369/286; 430/270.11

(56) References Cited

U.S. PATENT DOCUMENTS

| | | |
|---|---|---|
| 5,602,209 A | 2/1997 | Warchol et al. |
| 6,011,772 A | 1/2000 | Rollhaus et al. |
| 6,338,933 B1 | 1/2002 | Lawandy et al. |
| 6,343,063 B1 | 1/2002 | Rollhaus et al. |
| 6,434,109 B2 | 8/2002 | Rollhaus et al. |
| 6,511,728 B1 | 1/2003 | Bakos et al. |
| 6,531,262 B1 | 3/2003 | Lawandy et al. |
| 6,537,635 B1 | 3/2003 | Bakos et al. |
| 2002/0076647 A1 | 6/2002 | Lawandy et al. |
| 2002/0102499 A1 | 8/2002 | Krieg-Kowald |
| 2002/0172143 A1 | 11/2002 | Lawandy et al. |
| 2003/0002431 A1 | 1/2003 | Breitung et al. |
| 2003/0003394 A1 | 1/2003 | Lawandy et al. |
| 2003/0099186 A1 | 5/2003 | Bakos et al. |
| 2003/0112737 A1 | 6/2003 | Thompson et al. |
| 2003/0123379 A1 | 7/2003 | Thompson et al. |
| 2003/0129408 A1 | 7/2003 | Thompson et al. |

FOREIGN PATENT DOCUMENTS

| | | |
|---|---|---|
| EP | 0 458 521 | 11/1991 |
| EP | 0 792 756 | 9/1997 |
| JP | 2000 297151 | 10/2000 |
| WO | WO 03/089528 | 10/2003 |
| WO | WO 03/090219 | 10/2003 |

OTHER PUBLICATIONS

PCT Search Report—Nov. 5, 2004.
Lawandy, "Absorbing Barrier Layer for Optical Media", US Provisional Patent Application, Oct. 4, 2002.
UNKNOWN, "Directory Read Inhibitor for Optical Storage Media", US Utility Patent Application (U.S. Appl. No. 60/143,474), Jul. 12, 1999.
UNKNOWN, "Limited Play Optical Devices With Interstitial Reactive Layer and Methods of Making Same", US Utility Patent Application (U.S. Appl. No. 60/295,903), Jun. 5, 2001.

*Primary Examiner*—Randy Gulakowski
*Assistant Examiner*—Christopher Keehan
(74) *Attorney, Agent, or Firm*—Christopher L. Bernard, Esq.

(57) ABSTRACT

The present invention provides a reactive adhesive formulation for use in a limited play data storage medium, the reactive adhesive formulation including at least one adhesive material, at least one reactive material disposed within the at least one adhesive material and at least one photo-bleaching retarder material disposed within the at least one adhesive material. The at least one photo-bleaching retarder material includes resorcinol, 4-hexylresorcinol and/or polyhydroxystyrene.

16 Claims, 3 Drawing Sheets

LIMITED PLAY DATA STORAGE MEDIA AND ASSOCIATED METHODS OF MANUFACTURE

FIELD OF THE INVENTION

The present invention relates generally to data storage media. More specifically, the present invention relates to limited play data storage media, including limited play optical, magnetic and magneto-optic data storage media.

BACKGROUND OF THE INVENTION

Optical, magnetic and magneto-optic data storage media are examples of high performance data storage technologies. Each of these data storage technologies exhibits a relatively high storage capacity coupled with a relatively low cost per megabyte of data stored. The use of optical data storage media has become widespread in audio, video and computer data applications, including the use of the compact disc (CD), the digital versatile disc (DVD), multi-layer structures (such as DVD-5 and DVD-9), multi-sided structures (such as DVD-10 and DVD-18), the magneto-optic disc (MO), other write-once and re-writable formats (such as CD-R, CD-RW, DVD-R, DVD-RW, DVD+RW and DVD-RAM) and the like, collectively referred to herein as "data storage media". In each of these formats, data is encoded onto a substrate in a digital data series. For example, in pre-recorded optical data storage media, such as the CD, the data is encoded into a plurality of pits and grooves formed on the surface of a plastic substrate via injection molding, stamping or the like.

In various applications, it is desirable to have a data storage medium with a limited life. For example, music, movies and video games are often rented to customers for a predetermined period of time. At the end of this predetermined period of time, the customer must return the rented item to the renter. As a result, the renter must keep track of each rented item. This tracking function is labor intensive, time consuming and expensive. Further, rented items are susceptible to damage by customers. Likewise, sample computer programs are often provided to potential customers in order to entice them to purchase the computer programs. These "demo" programs must, by their nature, have a limited life. Thus, it is desirable to have limited play data storage media.

There are several conventional methods for manufacturing limited play data storage media. One method includes forming a disc wherein the reflective layer is protected with a porous layer such that the reflective layer becomes oxidized over a predetermined period of time. Once the reflective layer attains a given level of oxidation, the disc is no longer readable. Another method includes depositing a coating containing a reactive dye and, optionally, one or more other additives on the surface of the disc. Upon exposure to oxygen, the reactive dye, which is initially colorless, is oxidized to form an opaque or semi-opaque layer over a predetermined period of time, rendering the disc unreadable. Alternatively, a layer containing the reactive dye is "sandwiched" between the other layers of the disc.

The problem with each of the conventional methods for manufacturing limited play data storage media is that the method is "defeatable". In other words, individuals and cottage industries may alter the associated data storage medium such that it has unlimited playability. For example, the reactive dye method may be defeated by photo-bleaching the opaque or semi-opaque layer. Although various additives have been used to reduce the threat of photo-bleaching, none provide adequate security. Thus, a true limited play data storage medium has not yet been attained and music companies, movie studios, video game manufacturers, software manufacturers and the like do not have adequate protection for their intellectual property.

BRIEF SUMMARY OF THE INVENTION

The present invention provides limited play data storage media, including limited play optical, magnetic and magneto-optic data storage media. In general, the data storage media of the present invention include an adhesive layer containing a reactive dye, such as an essentially colorless leuco dye (e.g., methylene blue), and one or more additives. Preferably, the one or more additives include resorcinol or a derivative of resorcinol and, optionally, poly(hydroxy styrene) (PHS). Advantageously, it has been discovered that the photo-bleaching of data storage media containing methylene blue, resorcinol and PHS in the adhesive layer is significantly retarded as compared to the photo-bleaching of conventional data storage media.

In one embodiment of the present invention, a reactive adhesive formulation for use in a limited play data storage medium includes at least one adhesive material, at least one reactive material disposed within the at least one adhesive material and at least one photo-bleaching retarder material disposed within the at least one adhesive material. Preferably, the at least one photo-bleaching retarder material includes resorcinol or 4-hexylresorcinol. The resorcinol or 4-hexylresorcinol is present in a range of between about 0 weight % and about 10 weight %, based upon the total weight of the reactive adhesive formulation, and preferably in a range of between about 2 weight % and about 5 weight %. The at least one photo-bleaching retarder material may also include polyhydroxystyrene. The polyhydroxystyrene is present in a range of between about 0 weight % and about 12 weight %, based upon the total weight of the reactive adhesive formulation, and preferably in a range of between about 7 weight % and about 12 weight %. Optionally, the at least one photo-bleaching retarder material includes a combination of resorcinol or 4-hexylresorcinol and polyhydroxystyrene. The at least one reactive material includes oxygen sensitive leuco methylene blue, a reduced form of methylene blue, the corresponding reduced forms of brilliant cresyl blue, basic blue 3, toluidine 0, a derivative of one of the foregoing reactive materials or a combination including at least one of the foregoing reactive materials. The at least one adhesive material includes an optical grade UV-curable bonding adhesive or an epoxy, such as those comprising acrylates, methacrylates, urethanes or vinyl monomers.

In another embodiment of the present invention, a limited play data storage medium includes at least one substrate and at least one of a reactive layer and a reactive adhesive layer disposed directly or indirectly adjacent to a surface of the substrate. If used, the reactive layer includes at least one carrier material, at least one reactive material disposed within the at least one carrier material and at least one photo-bleaching retarder material disposed within the at least one carrier material. If used, the reactive adhesive layer includes at least one adhesive material, at least one reactive material disposed within the at least one adhesive material and at least one photo-bleaching retarder material disposed within the at least one adhesive material. Preferably, the at least one photo-bleaching retarder material includes resorcinol or 4-hexylresorcinol. The resorcinol or 4-hexylresorcinol is present in a range of between about 0 weight % and about 10 weight %, based upon the total weight of the reactive adhesive layer, and preferably in a range of between about 2 weight % and about 5 weight %. The at least one photo-bleaching retarder material may also include polyhydroxystyrene. The polyhydroxystyrene is present in a range of between about 0 weight % and about 12 weight %, based upon the total weight of the reactive adhesive layer, and preferably in a range of between about 7 weight % and about 12 weight %. Optionally, the at least one photo-bleaching retarder material includes a combination of resorcinol or 4-hexylresorcinol and polyhydroxystyrene. The at least one reactive material includes oxygen sensitive leuco methylene blue, a reduced form of methylene blue, the corresponding reduced forms of brilliant cresyl blue, basic blue 3, toluidine 0, a derivative of one of the foregoing reactive materials or a combination including at least one of the foregoing reactive materials. The at least one adhesive material includes an optical grade UV-curable bonding adhesive or an epoxy, such as those comprising acrylates, methacrylates, urethanes or vinyl monomers. The at least one carrier material includes thermoplastic acrylic polymers, polyester resins, epoxy resins, polythiolenes, UV curable organic resins, polyurethanes, thermosettable acrylic polymers, alkyds, vinyl resins or reaction products or combinations including at least one of the foregoing carrier materials. The at least one substrate includes polyvinyl chloride, polyolefins, polyesters, polyamides, polysulfones, polyimides, polyether imides, polyether sulfones, polyphenylene sulfides, polyether ketones, polyether ether ketones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride or tetrafluoroethylenes. Preferably, the at least one substrate includes at least one substantially colorless or substantially red-colored substrate.

DETAILED DESCRIPTION OF THE INVENTION

Figure 1:
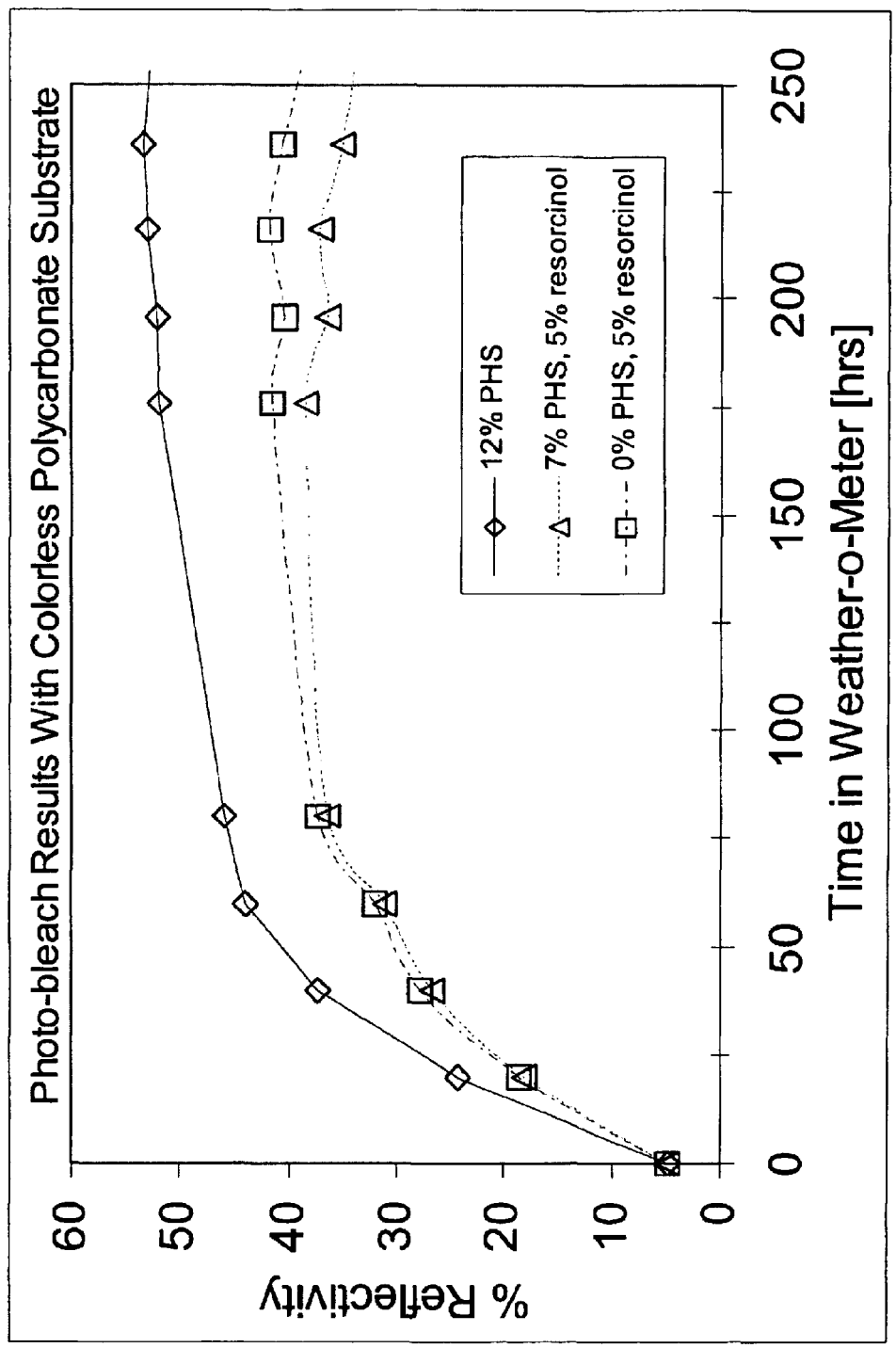
FIG. 1 is a graph illustrating the relative photo-bleaching performance of a plurality of exemplary reactive adhesive formulations using a colorless substrate.

The present invention provides limited play data storage media, including limited play optical, magnetic and magneto-optic data storage media. In general, the data storage media of the present invention include an adhesive layer containing a reactive dye, such as an essentially colorless leuco dye (e.g., methylene blue), and one or more additives. Preferably, the one or more additives include resorcinol or a derivative of resorcinol and, optionally, poly(hydroxy styrene) (PHS). Advantageously, it has been discovered that the photo-bleaching of data storage media containing methylene blue, resorcinol and PHS in the adhesive layer is significantly retarded as compared to the photo-bleaching of conventional data storage media.

A data storage medium includes a substrate having low birefringence and high light transmittance at a read laser wavelength. In other words, the data storage medium is readable in an optical media device or the like. The data storage medium also includes a reactive adhesive layer, a data layer and a reflective layer. Typically, the read laser wavelength is in the range of between about 390 nm and about 430 nm (incorporating a blue or blue-violet laser), or in the range of between about 630 nm and about 650 nm (incorporating a red laser). The data storage medium may further include a light-absorbing layer and, optionally, a reactive layer. The substrate is made of a material having sufficient optical clarity to render the data layer readable in the optical media device, i.e. the substrate has a birefringence of about ±100 nm or less. In theory, any plastic that exhibits these properties may be employed as the substrate. However, the plastic must be capable of withstanding the required processing parameters, such as the application of subsequent layers via sputtering or the like at temperatures of between about 25 degrees C. (room temperature) and about 150 degrees C. The plastic must also be capable of withstanding typical storage conditions, such as storage in a hot car at temperatures up to about 70 degrees C. In other words, it is desirable for the plastic to have sufficient thermal stability to prevent deformation during the various layer deposition steps, as well as during storage by the end-user. Suitable plastics include thermoplastics with glass transition temperatures of about 100 degrees C. or more, preferably about 125 degrees C. or more, more preferably about 150 degrees C. or more, most preferably about 200 degrees C. or more. Examples include polyetherimides, polyetheretherketones, polysulfones, polyethersulfones, polyetherethersulfones, polyphenylene ethers, polyimides and polycarbonates. Plastics with glass transition temperatures of about 250 degrees C. or more include polyetherimides in which sulfonedianiline or oxydianiline has been substituted for m-phenylenediamine, as well as polyimides and combinations of the above-referenced plastics. Typically, polycarbonates are employed.

Suitable substrate materials include, but are not limited to, amorphous, crystalline and semi-crystalline thermoplastics, such as: polyvinyl chloride, polyolefins (including, but not limited to, linear and cyclic polyolefins, polyethylene, chlorinated polyethylene and polypropylene), polyesters (including, but not limited to, polyethylene terephthalate, polybutylene terephthalate and polycyclohexylmethylene terephthalate), polyamides, polysulfones (including, but not limited to, hydrogenated polysulfones), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile and styrene-co-maleic anhydride), polybutadiene, polyacrylates (including, but not limited to, polymethylmethacrylate (PMMA) and methyl methacrylate-polyimide copolymers), polyacrylonitrile, polyacetals, polycarbonates, polyphenylene ethers (including, but not limited to, those derived from 2,6-dimethylphenol and copolymers with 2,3,6-trimethylphenol), ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride and tetrafluoroethylenes (e.g., Teflons).

As used herein, the terms "polycarbonate" and "polycarbonate composition" include compositions having structural units of the formula (I):

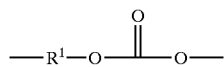

(I)

in which at least about 60 percent of the total number of $R^1$ groups are aromatic organic radicals and the balance thereof are aliphatic, alicyclic or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene and adamantylidene. In another exemplary embodiment, zero atoms separate $A^1$ from $A^2$, with an illustrative example being biphenol. The bridging radical $Y^1$ can be a hydrocarbon group or a saturated hydrocarbon group, for example, methylene, cyclohexylidene, isopropylidene or a herteroatom, such as —O— or —S—.

Polycarbonates can be produced by the reaction of dihydroxy compounds in which only one atom separates $A^1$ from A2. As used herein, the term "dihydroxy compound" includes, for example, a bisphenol compound having the general formula (III):

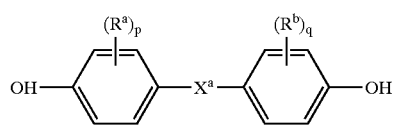

(III)

wherein $R^a$ and $R^b$ each independently represent hydrogen, a halogen atom or a monovalent hydrocarbon group; p and q are each independently integers from 0 to 4; and $X^a$ represents one of the groups of formula (IV):

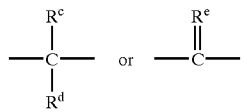

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons, such as those disclosed by name or formula (generic or specific) in U.S. Pat. No. 4,217,438. A non-exclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-3-methylphenyl) propane (hereinafter "DMBPA"); 1,1-bis(4-hydroxy-t-butylphenyl) propane; bis(hydroxyaryl) alkanes, such as 2,2-bis(4-hydroxy-3-bromophenyl) propane; 1,1-bis(4-hydroxyphenyl) cyclopentane; 9,9'-bis(4-hydroxyphenyl) fluorene; 9,9'-bis(4-hydroxy-3-methylphenyl) fluorene; 4,4'-biphenol; bis(hydroxyaryl) cycloalkanes, such as 1,1-bis(4-hydroxyphenyl) cyclohexane and 1,1-bis(4-hydroxy-3-methylphenyl) cyclohexane (hereinafter "DMBPC" or "BCC"); and the like, as well as combinations including at least one of the above-referenced bisphenol compounds.

It is also possible to employ polycarbonates resulting from the polymerization of two or more different dihydric phenols or a copolymer of a dihydric phenol with a glycol or with a hydroxy or acid-terminated polyester or with a dibasic acid or with a hydroxy acid or with an aliphatic diacid in the event that a carbonate copolymer, rather than a homopolymer, is desired for use. Generally, useful aliphatic diacids have carbon atoms in the range of between about 2 and about 40. A preferred aliphatic diacid is dodecandioic acid.

Polyarylates and polyester-carbonate resins or their blends may also be employed. Branched polycarbonates are also useful, as well as blends of linear polycarbonates and branched polycarbonates. The branched polycarbonates may be prepared by adding a branching agent during polymerization.

Branching agents are well known to those of ordinary skill in the art and may include polyfunctional organic compounds containing at least three functional groups which may be hydroxyl, carboxyl, carboxylic anhydride, haloformyl and mixtures comprising at least one of the foregoing branching agents. Specific examples include, but are not limited to, trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl) benzene), tris-phenol PA (4(4(1,1-bis(p-hydroxyphenyl)-ethyl)α,α-dimethyl benzyl)phenol), 4-chloroformyl phthalic anhydride, trimesic acid, and benzophenone tetracarboxylic acid, as well as combinations including at least one of the foregoing branching agents. The branching agents may be added at a level in the range of between about 0.05 and about 2 weight percent, based upon the total weight of the substrate. Examples of branching agents and procedures for making branched polycarbonates are described in U.S. Pat. Nos. 3,635,895 and 4,001,184. All types of polycarbonate end groups are contemplated herein.

Preferred polycarbonates are based on bisphenol A, in which each of $A^1$ and $A^2$ is p-phenylene and $Y^1$ is isopropylidene. Preferably, the average molecular weight of the polycarbonate is between about 5,000 and about 100,000 atomic mass units, more preferably between about 10,000 and about 65,000 atomic mass units, most preferably between about 15,000 and about 35,000 atomic mass units.

In monitoring and evaluating polycarbonate synthesis, it is of particular interest to determine the concentration of Fries product present in the polycarbonate. The generation of significant Fries product can lead to polymer branching, resulting in uncontrollable melt behavior. As used herein, the terms "Fries" and "Fries product" denote a repeating unit in a polycarbonate having the formula (V):

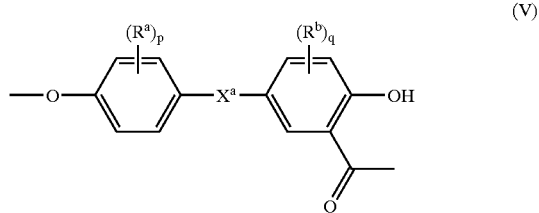

wherein $X^a$ is a bivalent radical as described with reference to Formula (III) above.

The polycarbonate composition may also include various additives ordinarily incorporated in resin compositions of this type. Such additives include, for example, fillers or reinforcing agents, heat stabilizers, antioxidants, light stabilizers, plasticizers, antistatic agents, mold releasing agents, additional resins and blowing agents, as well as combinations including at least one of the foregoing additives.

In order to aid in the processing of the substrate material (e.g., the production of a polycarbonate via a melt process) or to control a property of the substrate material (e.g., viscosity), one or more catalysts may also be employed. Exemplary catalysts include, but are not limited to, tetraalkylammonium hydroxide and tetraalkylphosphonium hydroxide, with diethyldimethylammonium hydroxide and tetrabutylphosphonium hydroxide preferred. The one or more catalysts may be employed alone or in combination with quenchers, such as acids (e.g., phosphorous acid) and the like. Additionally, water may be injected into the polymer melt during compounding and removed as water vapor through a vent to remove residual volatile compounds.

Data storage media can be produced by first forming the substrate material using a conventional reaction vessel capable of adequately mixing various precursors, such as a single or twin-screw extruder, kneader, blender or the like. The extruder should be maintained at a sufficiently high temperature to melt the substrate material precursors without causing the decomposition thereof. For polycarbonates, for example, temperatures in the range of between about 220 degrees C. and about 360 degrees C. can be used, preferably in the range of about 260 degrees C. and about 320 degrees C. Similarly, the residence time in the extruder should be controlled to minimize decomposition. Residence times of up to about 2 minutes or more can be employed, with residence times of up to about 1.5 minutes preferred and residence times of up to about 1 minute especially preferred. Prior to extrusion into the desired form (typically pellets, a sheet, a web or the like), the mixture can optionally be filtered, such as by melt filtering, the use of a screen pack or combinations thereof, to remove undesirable contaminants and/or decomposition products.

Once the plastic composition has been produced, it can be formed into the substrate using various molding and/or processing techniques. Exemplary molding and/or processing techniques include, but are not limited to, injection molding, film casting, extrusion, press molding, blow molding and stamping. Once the substrate has been produced, additional processing, such as electroplating, coating (via spin coating techniques, spray coating techniques, vapor deposition techniques, screen printing techniques, painting techniques, dipping techniques and the like), lamination, sputtering and/or the like, may be employed to dispose desired layers on the substrate. Typically, the substrate has a thickness of up to about 600 microns.

An example of a limited play polycarbonate data storage medium includes an injection molded polycarbonate substrate. Other various layers that may be disposed on the substrate include: one or more data layers, one or more dielectric layers, one or more reactive layers, one or more adhesive layers, one or more reflective layers, one or more protective layers, an additional substrate and one or more light-absorbing layers, as well as combinations including at least one of the foregoing layers. An optical data storage medium may include, for example, a protective layer, a reflective layer, a dielectric layer and a data layer, with a subsequent dielectric layer in contact with the substrate and a light-absorbing layer disposed on the opposite side of the substrate via a reactive adhesive layer, optionally with a reactive layer disposed between the substrate and the light-absorbing layer. It is to be understood that the form of the data storage media is not limited to a disc shape, but may be of any shape and size that may be accommodated in a readout device.

With respect to recordable data storage media, the data is encoded by a laser that illuminates an active data layer that undergoes a phase change, thus producing a series of highly-reflective and/or non-reflective regions making up a data stream. In such formats, a laser beam first travels through the substrate before reaching the data layer. At the data layer, the beam is either reflected or not, in accordance with the encoded data. The laser beam then travels back through the substrate and into an optical detector system where the data is interpreted. Thus, the data layer is disposed between the substrate and the reflective layer. The data layer for an optical application typically comprises pits and/or grooves on the substrate. Preferably, the data layer is embedded in the surface of the substrate. Typically, an injection molding-compression technique is used to produce the substrate, wherein a mold is filled with a molten polymer. The mold may contain a preform, insert, etc. The polymer is cooled and, while still in at least a partially molten state, compressed to imprint the desired surface features, such as pits and/or grooves, arranged in a spiral concentric or other suitable orientation onto the desired portions of the substrate (e.g., one or both sides of the substrate).

Exemplary data layers for magnetic or magneto-optic applications include any material that is capable of storing retrievable data, such as: oxides (including, but not limited to, silicon oxide), rare earth elements and transition metal alloys, such as nickel, cobalt, chromium, tantalum, platinum, terbium, gadolinium, iron, boron and combinations and alloys including at least one of the foregoing, organic dyes (e.g., cyanine and phthalocyanine-type dyes) and inorganic phase change compounds (e.g., TeSeSn and InAgSb).

The one or more protective layers that protect against dust, oils and other contaminants can have a thickness of greater than about 100 microns to less than about 10 Å, with a thickness of about 300 Å or less preferred in some embodiments and a thickness of about 100 Å or less especially preferred in some embodiments. The thickness of the one or more protective layers is usually determined, at least in part, by the type of read/write mechanism employed (e.g., optical, magnetic or magneto-optic). Exemplary protective layers include, but are not limited to, anti-corrosive materials, such as gold, silver, nitrides (e.g., silicon nitride and aluminum nitride), carbides (e.g., silicon carbide), oxides (e.g., silicon dioxide), polymeric materials (e.g., polyacrylates and polycarbonates), carbon film (e.g., diamond and diamond-like carbon) and combinations including at least one of the foregoing.

The one or more dielectric layers, which may be disposed on one or both sides of the data layer and are often employed as heat controllers, typically have a thickness of as high as about 1,000 Å or more and as low as about 200 Å or less. Exemplary dielectric layers include, but are not limited to, nitrides (e.g., silicon nitride and aluminum nitride), oxides (e.g., aluminum oxide), sulfides (e.g., zinc sulfide), carbides (e.g., silicon carbide) and combinations including at least one of the foregoing, among other materials compatible within the environment of and preferably not reactive with the surrounding layers.

The one or more reflective layers should have sufficient thickness to reflect a sufficient amount of energy (e.g., light) to enable data retrieval. Typically, the one or more reflective layers have a thickness of up to about 700 Å, with a thickness in the range of about 300 Å to about 600 Å preferred. Exemplary reflective layers include any material capable of reflecting the particular energy field, including metals (e.g., aluminum, gold, silver, silicon, titanium and alloys and combinations including at least one of the foregoing).

The one or more reactive layers and/or the one or more reactive adhesive layers each include a reactive material. The reactive material initially provides sufficient transmission to enable data retrieval by the data storage media device and subsequently forms one or more layers that inhibit data retrieval by the data storage media device. In other words, the reactive material absorbs a predetermined amount of incident light, reflected light or a combination thereof at the wavelength of the light source associated with the data storage media device. Typically, a layer that allows an initial percent reflectivity from the reflective layer of about 50% or greater can be employed, with an initial percent reflectivity of about 65% or greater preferred and an initial percent reflectivity of about 75% or greater more preferred. Once the given data storage medium has been exposed to oxygen (e.g., air) for a desired period of time (e.g., the desired allowable play time of the data storage medium), the layer preferably allows a subsequent percent reflectivity from the reflective layer of about 45% or less, with a subsequent percent reflectivity of about 30% or less more preferred, a subsequent percent reflectivity of about 20% or less even more preferred and a subsequent percent reflectivity of about 10% or less most preferred.

Exemplary reactive materials include, but are not limited to, oxygen sensitive leuco methylene blue or reduced forms of methylene blue, brilliant cresyl blue, basic blue 3 and toluidine 0, as well as reaction products and combinations including at least one of the foregoing, the structures of which are set forth below:

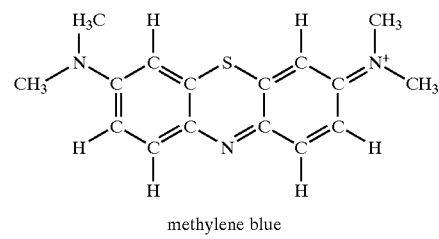

methylene blue

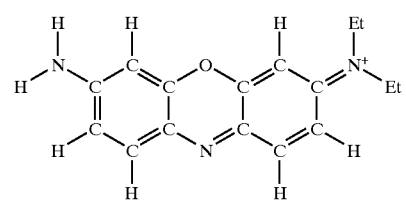

brilliant cresyl blue

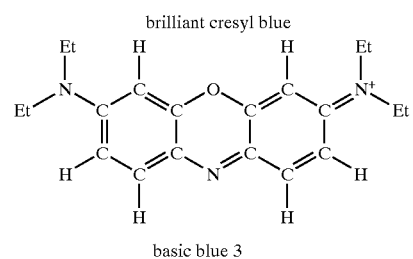

basic blue 3

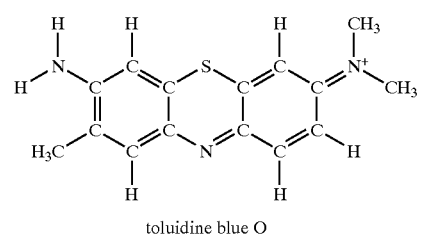

toluidine blue O

Another possible reactive material includes a dye that reoxidizes over approximately 48 hours.

The method of synthesis of leuco methylene blue and the oxygen dependent reoxidation to create the colored form of the methylene blue is shown below:

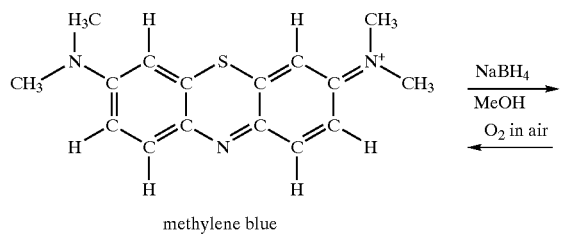

methylene blue

Additionally, the one or more reactive layers and/or the one or more reactive adhesive layers may contain at least one photo-bleaching retarder, such as a polyhydroxy compound. Suitable polyhydroxy compounds include, but are not limited to, biphenols and biphenol derivatives, bisphenols and bisphenol derivatives, other diols, di and tri-hydroxybenzene derivatives and combinations thereof. The photo-bleaching retarder can be a small molecule or polymer, such as polyhydroxystyrene (poly-4-vinyl phenol). The polyhydroxy compound effectively reduces photo-bleaching. Typically, the critical reflectivity is less than about 20%. More typically, the critical reflectivity is less than about 10%.

Suitable polyhydroxy compounds include those represented by the formula (VI):

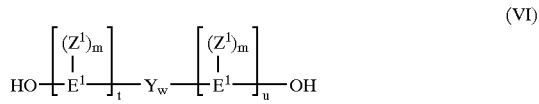

wherein Y represents a non-conjugated bridging group (e.g., alkylene, oxygen, sulfur, —$OCH_2CH_2O$— and the like) and w represents an integer between and including zero and three; $E^1$ represents an aromatic group (e.g., phenylene, biphenylene and naphthylene); $Z^1$ may be an inorganic atom including, but not limited to, halogen (fluorine, bromine, chlorine, iodine), an inorganic group including, but not limited to, nitro, an organic group including, but not limited to, a monovalent hydrocarbon group, such as alkyl, aryl, aralkyl, alkaryl, or cycloalkyl, or an oxy group, such as $OR^2$ (wherein $R^2$ is a hydrogen or a monovalent hydrocarbon group, such as alkyl, aryl, aralkyl, alkaryl, or cycloalkyl); m represents an integer between and including zero and the number of positions on $E^1$ that are available for substitution; t represents an integer equal to at least one; and u represents zero or an integer equal to at least one. In some particular embodiments, $Z^1$ includes a halo group or a $C_1$–$C_6$ alkyl group. When more than one $Z^1$ substituent is present, as represented by Formula (VI), they may be the same or different. The positions of the hydroxyl groups and $Z^1$ on the aromatic residues $E^1$ can be varied in the ortho, meta or para positions and the groupings can be in a vicinal, asymmetrical or symmetrical relationship, where two or more ring carbon atoms of the aromatic residue are substituted with $Z^1$ and hydroxyl groups.

Exemplary polyhydroxy compounds include those represented by the formula (VII):

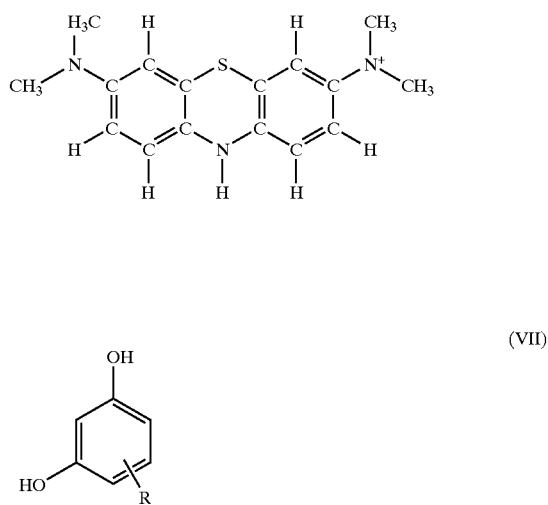

wherein R may be an inorganic atom including, but not limited to, halogen (fluorine, bromine, chlorine, iodine); an inorganic group including, but not limited to, nitro; or an organic group including, but not limited to, hydrogen or a monovalent hydrocarbon group, such as alkyl, aryl, aralkyl, alkaryl, or cycloalkyl, an oxy group, such as $OR^2$ (wherein $R^2$ is a hydrogen or a monovalent hydrocarbon group, such as alkyl, aryl, aralkyl, alkaryl, or cycloalkyl), or an ester group, such as $C(O)OR^2$.

Exemplary polyhydroxy compounds include, but are not limited to, resorcinol, 2,4-biresorcinol, me4biphenol, bisphenol A, 1,1,1-tris(p-hrdroxyphenyl) ethane (hereinafter "THPE"); 4-hexylresorcinol, 4,4'-biphenol, 3,3'-biphenol, 2,2'-biphenol, 2,2',6,6'-tetramethyl-3,3',5,5'-tetrabromo-4,4'-biphenol, 2,2',6,6'-tetramethyl-3,3',5-tribromo-4,4'-biphenol, 3,3'-dimethylbiphenyl-4,4'-diol, 3,3'-ditert-butylbiphenyl-4,4'-diol, 3,3',5,5'-tetramethylbiphenyl-4,4'-diol, 2,2'-ditert-butyl-5,5'-dimethylbiphenyl-4,4'-diol, 3,3'-ditert-butyl-5,5'-dimethylbiphenyl-4,4'-diol, 3,3',5,5'-tetratert-butylbiphenyl-4,4'-diol, 2,2',3,3',5,5'-hexamethylbiphenyl-4,4'-diol, 2,2',3,3',5,5',6,6'-octamethylbiphenyl-4,4'-diol, 3,3'-di-n-hexylbiphenyl-4,4'-diol, 3,3'-di-n-hexyl-5,5'-dimethylbiphenyl-4,4'-diol, 2-methylresorcinol, 5-methylresorcinol, 5-heptylresorcinol, resorcinol monoacetate, resorcinol monobenzoate, 2,4-dihydroxybenzophenone, 2,4,2',4'-tetrahydroxybenzophenone, 2,4-dihydroxybenzoic acid, 4-hexylresorcinol, 2,4-dihydroxybenzoic acid, 2,5-dihydroxybenzoic acid, 3,5-dihydroxybenzoic acid, 1,2,4-trihydroxybenzene, and the like. Typically, the polyhydroxy compound is present in a range of between about 1 weight % and about 20 weight %, more typically in a range of between about 3 weight % and about 15 weight %, and most typically in a range of between about 5 weight % and about 10 weight %, based upon the total weight of the reactive layer or reactive adhesive layer. In another embodiment, the polyhydroxy compound is present in a range of between about 2 weight % and about 4 weight %.

Other suitable polyhydroxy compounds include:

Cardol (a mixture of alk(en)ylresorcinols; present in Cashew Nut Shell Liquid):

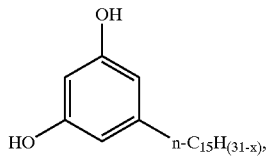

2-methylcardol,
esters of 2,4-dihydroxybenzoic acid (e.g., benzyl ester),
esters of 3,5-dihydroxybenzoic acid such as:

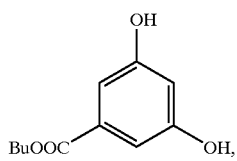

alkylene-bis-(dihydric phenol) ethers such as:

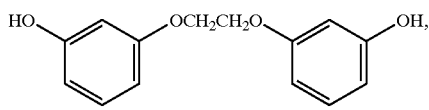

diamides of m-aminophenol such as:

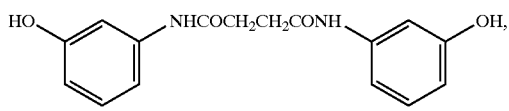

p-xylylene-bis-2,4-dihydroxybenzoate:

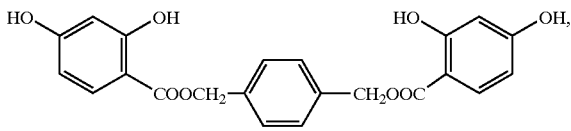

1,3-bis(4'-hydroxyphenoxy)benzene:

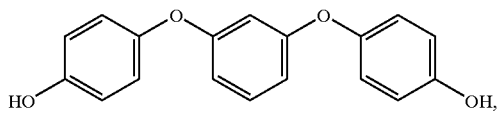

2,4-dihydroxybenzophenone,
2,4,2',4'-tetrahydroxybenzophenone,
2-hydroxy-4-(2-hydroxyethoxy)benzophenone,
2,2'-dihydroxy-4-methoxybenzophenone,
2,2'-dihydroxy-4,4'-dimethoxybenzophenone,
2-hydroxy-4-methoxybenzophenone-5-sulfonic acid,
phenyl 1-hydroxynapthoate (monohydroxy),
polyhydroxystyrene,
2-(2-hydroxy-p-anisoyl)benzoic acid,
2,4-dihydroxybenzoic acid,
2,5-dihydroxybenzoic acid,
3,5-dihydroxybenzoic acid,
1-hydroxy-2-napthoic acid (monohydroxy), and
polyvinylphenol.

In addition to the above-referenced reactive materials, numerous other dyes and light blocking materials can be synthesized and operate to render the data storage media limited play. For example, other possible reactive materials can be found in U.S. Pat. Nos. 4,404,257 and 5,815,484. The reactive material can also be a mixture including at least one of the above-referenced reactive materials.

The amount of reactive material in the reactive layer and/or the reactive adhesive layer is dependent upon the desired life of the data storage medium. For example, the amount of reactive material in the reactive layer can be as little as about 0.1 weight percent, with about 1 weight percent preferred, based upon the total weight of the reactive layer, with an upper amount of reactive material being about 10 weight percent, with about 7 weight percent preferred, about 6 weight percent more preferred, and about 5 weight percent most preferred.

In the case of the one or more reactive layers, the reactive material is preferably mixed with a carrier for deposition on, impregnation into or a combination of deposition on and impregnation into at least a portion of the surface of the substrate. The carrier is typically present in the range of between about 65% and about 85%, and more typically in the range of between about 70% and about 80%, based upon the total weight of the reactive layer. Exemplary carriers include thermoplastic acrylic polymers, polyester resins, epoxy resins, polythiolenes, UV curable organic resins, polyurethanes, thermosettable acrylic polymers, alkyds, vinyl resins and the like, as well as combinations including at least one of the foregoing. Polyesters include, for example, the reaction products of aliphatic dicarboxylic acids, including, for example, fumaric or maleic acid with glycols, such as ethylene glycol, propylene glycol, neopentyl glycol and the like, as well as reaction products and mixtures including at least one of the foregoing.

Exemplary epoxy resins that can be the used as the carrier include, but are not limited to, monomeric, dimeric, oligomeric and polymeric epoxy materials containing one or a plurality of epoxy functional groups. Examples include the reaction products of bisphenol-A and epichlorohydrin, epichlorohydrin with phenol-formaldehyde resins and the like. Other organic resins can be in the form of mixtures of polyolefin and polythiols, such as those provided in U.S. Pat. Nos. 3,697,395 and 3,697,402.

The term "thermoplastic acrylic polymers", as used herein, is meant to embrace within its scope those thermoplastic polymers resulting from the polymerization of one or more acrylic acid ester monomers, as well as methacrylic acid ester monomers. These monomers are represented by the general formula (VIII):

wherein W is hydrogen or a methyl radical and $R^f$ is an alkyl radical, preferably an alkyl radical including carbon atoms in the range of between about 1 and about 20. Some non-limiting examples of alkyl groups represented by $R^f$ include:

methyl, ethyl, n-propyl, isopropyl, n-butyl, isobutyl, sec-butyl, tert-butyl, pentyl, isopentyl, hexyl and the like.

Some non-limiting examples of acrylic acid ester monomers represented by Formula (VII) include: methyl acrylate, isopropyl acrylate, n-propyl acrylate, n-butyl acrylate, isobutyl acrylate, 2-ethylhexyl acrylate and the like. Some non-limiting examples of methacrylic acid ester monomers represented by Formula (VII) include: methyl methacrylate, ethyl methacrylate, butyl methacrylate, hexyl methacrylate, isobutyl methacrylate, propyl methacrylate and the like, as well as reaction products and combinations including at least one of the foregoing.

Copolymers of the above-referenced acrylate and methacrylate monomers are also included within the term "thermoplastic acrylic polymers", as it appears herein. Preferably, the thermoplastic acrylic polymer is a copolymer of poly (methyl methacrylate/methacrylic acid). The polymerization of the monomeric acrylic acid esters and methacrylic acid esters to provide the thermoplastic acrylic polymers may be accomplished by any polymerization technique well known to those of ordinary skill in the art. The thermoplastic acrylic polymers typically have an inherent viscosity of less than about 0.300 centimeters cubed per gram ($cm^3g^{-1}$), more typically of less than about 0.250 $cm^3g^{-1}$, and most typically of less than about 0.200 $cm^3g^{-1}$.

In order to enhance adhesion of the reactive layer to the substrate, in the event that a reactive layer is utilized, a primer may be employed therebetween. The thermoplastic acrylic polymers useful as primers include: acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers or an acrylic acid ester monomer and a methacrylic acid ester monomer; and the like, as well as combinations including at least one of the foregoing.

Mixtures of two or more of the above-referenced thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, an acrylic copolymer and a methacrylic homopolymer and reaction products thereof, can also be used.

Optionally, the reactive layer can be applied to the substrate using various coating techniques such as painting, dipping, spraying, spin coating, screen printing and the like. For example, the reactive layer can be mixed with a relatively volatile solvent, preferably an organic solvent, which is substantially inert towards the polycarbonate, i.e., will not attack and adversely affect the polycarbonate, but which is capable of dissolving the carrier. Generally, the concentration of the carrier in the solvent is about 5 weight % or greater, with about 10 weight % or greater preferred, while the upper range of the polymer is about 25 weight %, with about 20 weight % or less preferred. Examples of some suitable organic solvents include ethylene glycol diacetate, butoxyethanol, methoxypropanol, the lower alkanols and the like. Generally, the concentration of the solvent in the coating solution is about 70 weight % or greater, with about 75 weight % or greater preferred, while the upper range of the solvent is about 95 weight %, with about 85 weight % or less preferred.

The reactive layer may also optionally contain various additives, such as flatting agents, surface active agents, thixotropic agents and the like, and reaction products and combinations including at least one of the foregoing.

The thickness of the reactive layer is dependent upon the particular reactive material employed, the concentration thereof in the reactive layer and the desired absorption characteristics of the reactive layer, both initially and after a desired period of time. When the reactive material is applied in a coating formulation, the reactive layer can have a thickness as low as about 1 micron ($\mu$), with about $2\mu$ preferred, and about $3\mu$ more preferred. On the upper end, the thickness can be up to about $15\mu$ or greater, with up to about $10\mu$ preferred, and up to about $6\mu$ more preferred. When the reactive material is applied in the adhesive, the reactive layer can be between 30 and 80 microns, and more preferably between 40 and 60 microns.

Typically, the reactive layer and/or the reactive adhesive layer is disposed between the reflective layer and the substrate. The reactive layer and reflective layer may be in a sandwich configuration between the first substrate and a second substrate. The reactive layer in a sandwich configuration has a first percentage reflectivity that exceeds a second percentage reflectivity, wherein the second percentage reflectivity is a percentage reflectivity for the reactive layer had it not been in a sandwich configuration.

In one embodiment of the present invention, the data storage medium is produced in several steps. The steps include providing a first substrate and a second substrate; optionally disposing a reactive layer on the first substrate; disposing a reflective layer on the second substrate; optionally disposing a reactive layer on the reflective layer, with the proviso that there is at least one reactive layer or reactive adhesive layer in the data storage medium; and adhering the first substrate to the second substrate such that the layers are disposed between said first substrate and said second substrate.

In another embodiment of the present invention, the data storage medium is produced by providing a first substrate and a second substrate; disposing a reactive layer on said first substrate; disposing a reflective layer on said reactive layer; and adhering said first substrate to said second substrate such that the layers are disposed between said first substrate and said second substrate. Again, a reactive adhesive layer may be used, rather than the reactive layer.

In yet another embodiment of the present invention, the data storage medium is produced by providing a first substrate and a second substrate; optionally disposing a reactive layer on the first substrate; disposing a semi-reflective layer (for example gold, silver, silver alloys and/or silicon) on the first substrate, with the proviso that if the reactive layer is disposed on the first substrate, the gold layer is disposed on the reactive layer; optionally disposing a reactive layer on the gold layer; disposing a reflective layer on the second substrate; optionally disposing a reactive layer on the reflective layer, with the proviso that there is at least one reactive layer in said data storage medium; and adhering said first substrate to said second substrate such that the layers are disposed between said first substrate and said second substrate. Again, a reactive adhesive layer may be used, rather than the reactive layer(s).

Typically, the molded substrate is deaerated before the reactive layer is disposed on the substrate. Additionally, the reactants used to make the reactive layer are typically kept in an inert environment. After the data storage medium has been produced, the disc is typically kept in an inert environment until the disc is ready for use. Typically, deaeration can occur with any inert gas, for example, nitrogen, argon or helium.

Another layer that is present is a second substrate. The second substrate is typically a material that satisfies the physical properties given for the first substrate, described above. The second substrate may also include a colorant additive such that the second substrate is a light-absorbing layer to filter the light reaching the reactive layer. Photobleaching resistance may be improved by limiting the wavelengths of light that can be transmitted through the substrate into the reactive layer. The light-absorbing layer typically transmits less than about 90% of light in at least one wavelength a range between about 390 nm and about 630 nm. In a further embodiment of the present invention, the light-absorbing layer typically transmits less than about 10% of light in at least one wavelength in a range between about 455 nm and about 620 nm, and more typically, transmits less than about 10% of light in a range between about 475 nm and about 620 nm. Most typically, the light-absorbing layer transmits less than about 1% of light in at least one wavelength in a range between about 550 nm and about 620 nm. In a further embodiment of the present invention, the light-absorbing layer typically transmits less than about 60% of light in at least one wavelength in a range between about 390 nm and about 620 nm, more typically transmits less than about 40% of light in at least one wavelength in a range between about 390 nm and about 620 nm, and most typically less than about 10% of light in at least one wavelength in a range between about 390 nm and about 620 nm. The light-absorbing layer is disposed between the reactive layer and the laser beam. Typically the light-absorbing layer has a thickness of up to about 600 microns.

Typically, a colorant or combination of colorants is present in the light-absorbing layer. The colorant is typically present in a range between about 0.00001 weight % and about 2 weight %, more typically, in a range between about 0.001 weight % and about 1 weight %, and most typically, in a range between about 0.01 weight % and about 0.5 weight %, based on the total weight of the light-absorbing layer. Colorants are also preferably selected so that they solubilize in the material used to form the layer in which the colorant is disposed. Colorants that are soluble in the materials used for DVD layers include dyes (e.g., "solvent dyes"), organic colorants, pigments, and the like, which behave like dyes; i.e., colorants that disperse in the plastic and do not form aggregates having a size greater than or equal to about 200 nm, with an aggregate size less than or equal to about 50 nm preferred. Some suitable colorants include, but are not limited to, those of the chemical family of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl)biphenyl derivatives, and the like, as well as combinations including at least one of the foregoing colorants.

The following is a partial list of commercially available, suitable dyes:

Color Index Solvent Red 52
Color Index Solvent Red 207
Color Index Disperse Orange 47
Color Index Solvent Orange 60
Color Index Disperse Yellow 54
Color Index Disperse Yellow 201
Color Index Pigment Yellow 138
Color Index Solvent Violet 36
Color Index Solvent Violet 13
Color Index Disperse Violet 26
Color Index Solvent Blue 97
Color Index Solvent Blue 59
Color Index Solvent Green 3
Color Index Solvent Green 28
Color Index Solvent Red 135
Color Index Solvent Red 179
1,5-dihydroxy-4,8-bis(phenylamino)-9,10-anthracenedione An adhesive layer is also present that can adhere any combination of the above-referenced layers. In a preferred embodiment of the present invention, the adhesive layer comprises a reactive adhesive layer (described in further detail herein below). Optionally, the reactive adhesive layer comprises the sole reactive layer associated with the data storage medium. The adhesive layer can include any material that is capable of forming a layer penetrable by oxygen and that, unless otherwise so desired, does not substantially interfere with the transfer of light through the data storage medium from and to the data retrieval device (e.g., that is substantially transparent at the wavelength of light utilized by the data retrieval device, and/or which allows a reflectivity from the data storage medium of about 50% or greater, with a percent reflectivity of about 65% or greater preferred and a percent reflectivity of about 75% or greater more preferred). Exemplary adhesive materials include, but are not limited to, UV materials, such as acrylates (e.g., cross-linked acrylates and the like), silicon hardcoats and the like, as well as reaction products and combinations including at least one of the foregoing. Other examples of UV materials are described in U.S. Pat. Nos. 4,179,548 and 4,491,508. Some useful polyfunctional acrylate monomers include, for example, diacrylates of the formulas:

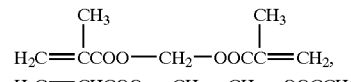
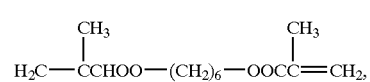

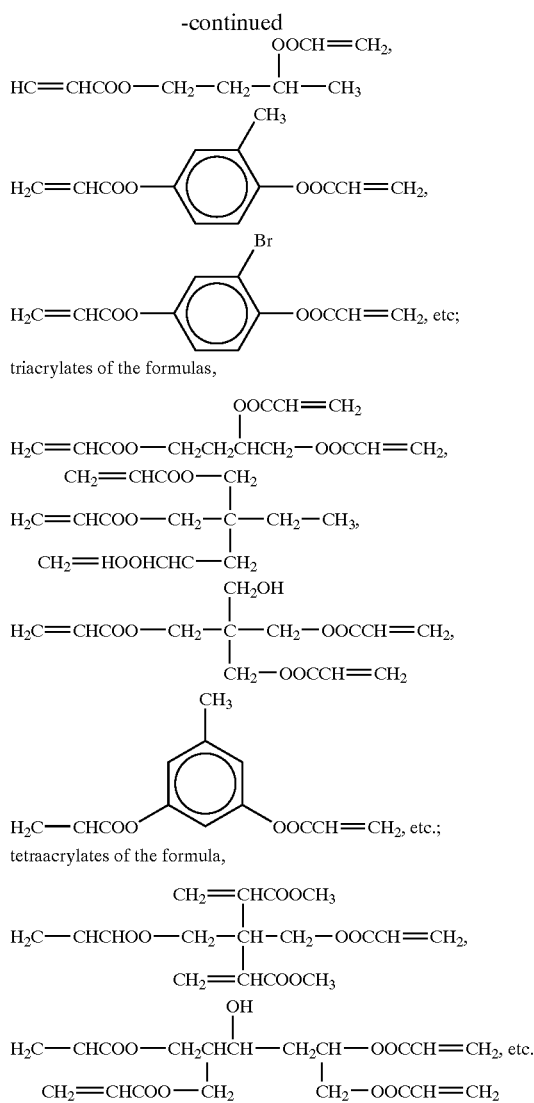

triacrylates of the formulas, tetraacrylates of the formula,

Although the adhesive layer may contain only one of said polyfunctional acrylate monomers, or a mixture including at least one of the polyfunctional acrylate monomers (and the UV light reaction product thereof), preferred coating compositions contain a mixture of two polyfunctional monomers (and the UV light reaction product thereof), preferably a diacrylate and a triacrylate (and the UV light reaction product thereof), with minor amounts of mono-acrylate used in particular instances. Optionally, the adhesive layer can comprise nonacrylic UV curable aliphatically unsaturated organic monomers in amounts up to about 50 weight % of the uncured adhesive coating that includes, for example, such materials as N-vinyl pyrrolidone, styrene and the like, and reaction products and combinations including at least one of the foregoing materials.

Optionally, the adhesive layer comprises a mixture of diacrylate and triacrylate monomers. Exemplary mixtures of diacrylates and triacrylates include mixtures of hexanediol diacrylate with pentaerythritol triacrylate, hexanediol diacrylate with trimethylolpropane triacrylate, diethylene glycol diacrylate with pentaerythritol triacrylate, and diethylene glycol diacrylate with trimethylolpropane triacrylate and the like.

The adhesive layer can also comprise a photosensitizing amount of photoinitiator, i.e., an amount effective to affect the photocure of the adhesive layer. Generally, this amount includes about 0.01 weight %, with about 0.1 weight % preferred, up to about 10 weight %, with about 5 weight % preferred, based upon the total weight of the adhesive layer. Exemplary photoinitiators include, but are not limited to, blends of ketone-type and hindered amine-type materials that form suitable hard coatings upon exposure to UV radiation. It is preferable that the ratio, by weight, of the ketone compound to the hindered amine compound be about 80/20 to about 20/80. Ordinarily, about 50/50 or about 60/40 mixtures are quite satisfactory.

Other possible ketone-type photoinitiators, which preferably are used in a nonoxidizing atmosphere, such as nitrogen, include: benzophenone and other acetophenones, benzil, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, α,α-diethoxyacetophenone, α,α-dimethoxyacetophenone, 1-phenyl-1,2-propanediol-2-o-benzoyl oxime, α,α-dimethoxy-α-phenylacetopheone, phosphine oxides and the like. Further included are reaction products and combinations including at least one of the foregoing photoinitiators.

The photocure of the adhesive layer may also be affected by the light-absorbing layer. When a light-absorbing layer is used that transmits more than about 5% of light in at least one wavelength in a range between about 330 nanometers and about 390 nanometers, or more preferably, transmits more than about 10% of light in at least one wavelength in a range between about 360 nanometers and about 370 nanometers, the adhesive layer has an improved bonding capability. When the adhesive layer has an "improved bonding capability", the time it takes the storage medium for data to reach 45% reflectivity exceeds the time is takes a storage medium for data to reach 45% reflectivity with a light-absorbing layer that absorbs light that falls outside the above-referenced range.

Optionally, the adhesive layer may also include flatting agents, surface active agents, thixotropic agents, UV light stabilizers, UV absorbers and/or stabilizers such as resorcinol monobenzoate, 2-methyl resorcinol dibenzoate and the like, as well as combinations and reaction products including at least one of the foregoing. The stabilizers can be present in an amount, based upon the weight of the uncured UV layer of about 0.1 weight %, preferably about 3 weight %, to about 15 weight %.

As described above, conventional limited play data storage media are made by incorporating an essentially colorless leuco dye in a reactive layer (comprising poly (methyl methacrylate) (PMMA) or the like) or, alternatively, in a UV-curable acrylate reactive adhesive layer used to bond the various layers of the data storage media. Upon exposure to oxygen, the leuco dye is oxidized to form a highly colored layer that serves to make the data storage media unplayable in a data storage media device. It has been found that limited play data storage media made using leuco methylene blue/methylene blue as the dye are relatively easily defeated via photo-bleaching by sunlight or other intense visible light such that the data storage media are no longer limited play.

Photo-bleaching may be significantly retarded through the addition of biphenol and/or polyhydroxystyrene (PHS) to the dye-containing layer(s). Preferably, the data storage media of the present invention also include one or more dye-containing layers that incorporate resorcinol, further retarding photo-bleaching. Through the addition of resorcinol to a dye-containing reactive layer or reactive adhesive layer, the color stability of an expired data storage medium may be improved from about 20 hrs in a weatherometer (about 1 week of sunlight exposure) to about 200 hrs in the weatherometer (about 10 weeks of sunlight exposure). Advantageously, the resorcinol-containing reactive layers and/or adhesive layers also demonstrate synergies with red substrate materials.

In general, poor solubility in an adhesive is observed with small molecule polyhydroxy compounds, such as biphenol, propyl gallate and the like. However, resorcinol demonstrates good solubility in the adhesive when PHS is present as a compatibilizer. For example, a formulation containing no PHS and about 10 wt % resorcinol provides a cloudy adhesive and the resulting data storage medium contains particulates. A formulation containing about 7 wt % PHS and about 5 wt % resorcinol provides a slightly cloudy adhesive, but the resulting data storage medium appears to be acceptable. A formulation containing about 12 wt % PHS and about 2–4 wt % resorcinol provides a relatively clear adhesive and the resulting data storage medium is acceptable. It is also desirable that the adhesive formulation remains stable during storage. After about 1 week of storage in a refrigerator, a formulation containing about 12 wt % PHS and about 5 wt % resorcinol was found to contain precipitated crystals of resorcinol. Alternatives to resorcinol with improved solubility and long term stability in the adhesive may be used. For example, formulations containing 4-hexylresorcinol or 4-chlororesorcinol provide relatively clear adhesives that remain stable after several weeks in a refrigerator. Table 1 summarizes the photo-bleaching performances for a number of exemplary reactive adhesive formulations using a colorless substrate. The data of Table 1 is plotted in FIG. 1.

TABLE 1

Photo-Bleaching Performance of Exemplary
Reactive Adhesive Formulations (Colorless Substrate)

| Colorless substrate | | | | | | | | | |
|---|---|---|---|---|---|---|---|---|---|
| Example | Additive | 0 | 20 | 40 | 60 | 80 | 176 | 196 | 216 |
| | | Time in weather-o-meter (hrs) % Ref after exposure time | | | | | | | |
| 1 | 12% PHS | 4.8 | 24.2 | 37.3 | 44.0 | 46.0 | 51.9 | 52.1 | 53.0 |
| 2 | 7% PHS, 5% RS | 4.8 | 18.1 | 26.6 | 31.1 | 36.3 | 38.3 | 36.5 | 37.2 |
| 3 | 0% PHS, 5% RS | 4.9 | 18.6 | 27.8 | 31.9 | 37.3 | 41.5 | 40.4 | 41.8 |

Figure 2:
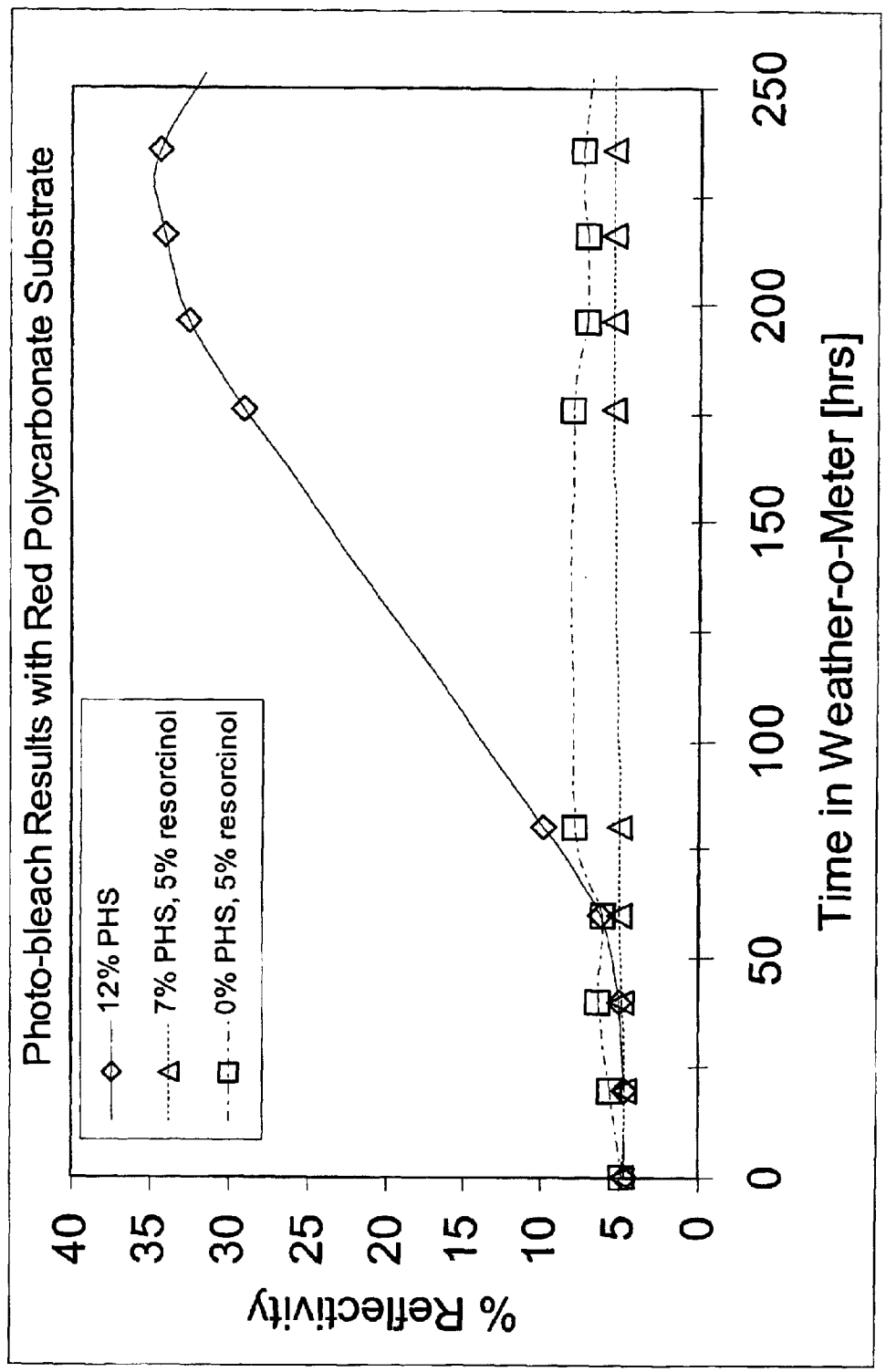
FIG. 2 is a graph illustrating the relative photo-bleaching performance of a plurality of exemplary reactive adhesive formulations using a red substrate.

Table 2 summarizes the photo-bleaching performances for a number of exemplary reactive adhesive formulations using a red substrate. The data of Table 2 is plotted in FIG. 2.

TABLE 2

Photo-Bleaching Performance of Exemplary
Reactive Adhesive Formulations (Red Substrate)

| Red substrate | | | | | | | | | |
|---|---|---|---|---|---|---|---|---|---|
| Example | Additive | 0 | 20 | 40 | 60 | 80 | 176 | 196 | 216 |
| | | Time in weather-o-meter (hrs) % Ref after exposure time | | | | | | | |
| 4 | 12% PHS | 4.8 | 4.7 | 5.0 | 6.3 | 9.9 | 29.1 | 32.5 | 34.1 |
| 5 | 7% PHS, 5% RS | 4.8 | 4.8 | 4.9 | 5.0 | 5.0 | 5.5 | 5.5 | 5.5 |
| 6 | 0% PHS, 5% RS | 4.9 | 5.7 | 6.3 | 6.1 | 7.9 | 8.1 | 7.1 | 7.2 |

It should be noted that examples 1–6, described above, are also provided as examples 39–44, described below. It should also be noted that the red substrate may be substantially red (i.e., pink, etc.)

In order that those of ordinary skill in the art will be better able to practice the present invention, the following examples of reactive adhesive layer formulations are given by way of illustration, and not by way of limitation:

Exemplary Formulation of DVD Bonding Adhesive Containing Triisopropylsilyloxycarbonyl Leuco Methylene Blue:

Part A:
10.65 g SR351 triacrylate (Sartomer; trimethylolpropane triacrylate)
21.29 g SR495 acrylate (Sartomer; caprolactone acrylate)
0.124 g Tinuvin 292 (Ciba Geigy)
0.86 g Irgacure 819 (Ciba Geigy)
5.0 g polyhydroxystyrene (ChemFirst; PHS-8E01)

Part B:
0.8 g TIPSOCLMB (Flexplay)
9.3 g SR339 acrylate (Sartomer; phenoxyethyl acrylate)

Part C:
2.0 g Sn(II) 2-ethylhexanoate (Aldrich)

The DVD bonding adhesive is an air-sensitive composition including three parts (A, B and C) that are mixed together within a few hours of use. Part A is prepared by first blending the Sartomer monomers SR351 and SR495 at room temperature with gentle stirring in air, followed by the dissolution of the polyhydroxystyrene powder (PHS-8EO1) with stirring and warming to 60° C. for about one hour. Under subdued lighting conditions, the Irgacure 819 is next added and stirring and heating are continued for about one-half hour. The powder and the total mixture should be handled with subdued or yellow filtered light from this point forward. Finally, the Tinuvin 292 is added and the mixture is briefly stirred in the dark until homogeneous (about ten minutes). Part A is relatively stable and may be stored in the dark at room temperature for several months before use. Part B is prepared by adding Sartomer SR339PI that had been stored over molecular sieves into a clean dry amber glass bottle followed by the addition of triisopropylsilyloxycarbonyl leuco methylene blue (hereinafter "TIPSOCLMB") powder. After sealing the bottle, the mixture is stirred for approximately one hour at room temperature. This solution has a limited shelf life (about 1–2 months), and should be stored in dry conditions in the dark at room temperature or below (it is relatively stable at −20 degrees C.). Part C is prepared by adding stannous ethylhexanoate (Aldrich Sn(II) 2-ethylhexanoate) to an appropriately sized container.

Within a few hours of use of the DVD bonding adhesive, the three parts are mixed together using the following procedure. The Part B container is opened and the entire weight of Part C are added via a syringe. The Part B container (now containing Part C) is then closed and shaken vigorously for 30 seconds. The Part A container is then opened and the entire contents of the Part B container are added. The Part A container is then closed and shaken vigorously for 1 minute, and then placed into a Sonifier bath for 15 minutes. The DVD bonding adhesive is used within 4 hours of mixing.

Exemplary Procedure for Bonding a DVD:

A DVD halfdisc (0.6 mm-thick polycarbonate) is centered data side up on a laboratory spin-coater. The disc is held stationary while the adhesive is dispensed on the data side in a manner creating a uniform circular ring of material at about 30–40 mm diameter from the center of the disc. The disc to be bonded is then slowly lowered down towards the solution with the edges slightly bowed away from the bottom disc. Care is taken not to entrap air between the top and bottom discs. After a few seconds, the adhesive spreads between the top and bottom discs or, alternatively, the disc is spun so that the material reaches the outer diameter of the disc. The disc is spun at 500 to 1000 rpm for about 10 seconds to level the adhesive layer and remove excess material. At this point, the disc is cured for about 2 seconds using a flash UV lamp (Xenon Corporation RC742) with a lamp distance of about 1.5 inches.

EXAMPLES 1–38

Figure 3:
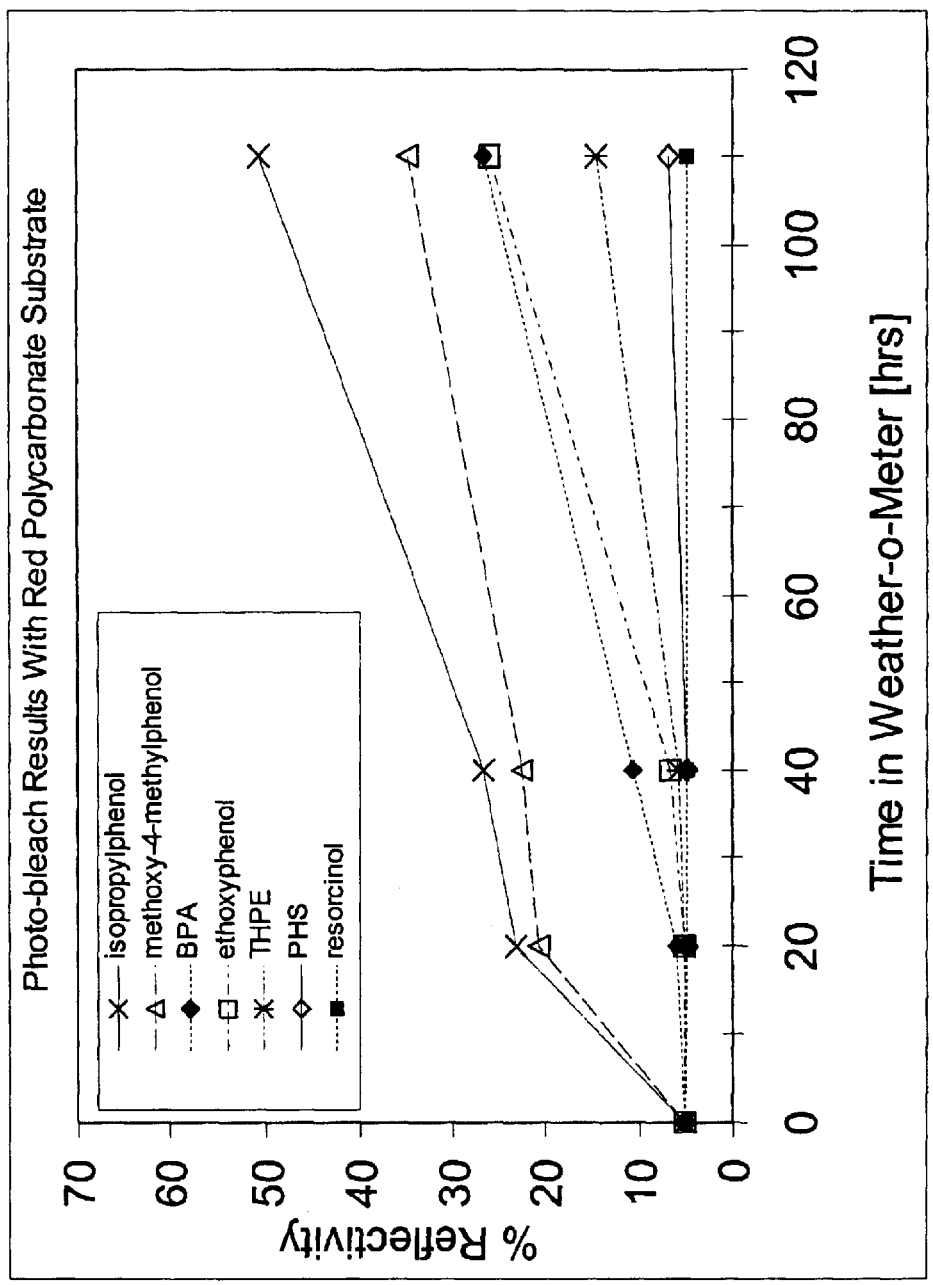
FIG. 3 is a graph illustrating the relative photo-bleaching performance of a plurality of exemplary reactive adhesive formulations using both colorless and red substrates and various photo-bleaching additives.

The following samples were prepared using various DVD bonding adhesives based on the above-referenced DVD bonding adhesive formulation, but with varying concentrations of polyhydroxystyrene (PHS) and, optionally, with varying concentrations of stabilizers, as indicated in the table below. In these examples, either colorless or red GE Lexan polycarbonate was used to mold the DVD substrates, as indicated in the table below. After bonding, the DVDs were exposed to air for at least 1 week to allow the reactive dye to substantially convert to methylene blue. The oxidized discs were then placed in an Atlas 3Sun Xenon Weather-o-meter operating at an irradiance of about 5 to about 5.5 kW/m$^2$ for the times indicated in the tables below. The reflectivities of the discs were measured before and after exposure using a Dr. Schenk Prometeus MT-136 optical disc tester. The values of reflectivity indicated below represent the intensity of reflected light expressed as a percentage of the light incident to the disc. Table 3 summarizes the photo-bleaching performances for a number of exemplary reactive adhesive formulations using both colorless and red substrates, wherein the PHS is replaced with various other photo-bleaching additives. The data of Table 3 is plotted in FIG. 3.

TABLE 3

Photo-Bleaching Performance of Exemplary Reactive Adhesive Formulations (Colorless and Red Substrates) (Examples 1–38)

| | | | | Time in weather-o-meter | |
| --- | --- | --- | --- | --- | --- |
| Example | Additive | Wt % additive | % Reflectivity after 0 hrs | colorless polycarbonate % Reflectivity after 20 hrs | red polycarbonate % Reflectivity after 20 hrs |
| 1–2 | none | 0 | 4.8 | 56 | 43.5 |
| 3 | PHS | 5 | 5.0 | 26.8 | |
| 4–5 | PHS | 10 | 5.1 | 11.5 | 4.8 |
| 6 | PHS | 15 | 4.9 | 4.9 | |
| 7 | Biphenol | 2.5 | 4.8 | 20.4 | |
| 8–9 | 4-isopropylphenol | 5 | 4.8 | 47.5 | 30.5 |
| 10–11 | THPE | 5 | 4.8 | 40 | 16.5 |
| 12–13 | bisphenol A | 5 | 4.9 | 42 | 19.1 |
| 14–15 | DMBPA | 5 | 3.9 | 56.1 | 41.5 |
| 16 | BHT | 5 | 4.8 | 51.5 | |
| 17–18 | irganox 1010 | 5 | 3.7 | 51.8 | 34.9 |
| 19–20 | irganox 1035 | 5 | 3.6 | 56.3 | 43 |
| 21–22 | irganox 1076 | 5 | 3.9 | 55.8 | 39.5 |
| 23–24 | Resorcinol | 10 | 5.0 | 6.1 | 4.8 |
| 25–26 | PHS | 10 | 5.0 | 10.0 | 4.8 |
| 27–28 | THPE | 10 | 5.0 | 20.0 | 5.0 |
| 29–30 | 4-ethoxyphenol | 10 | 4.9 | 24.1 | 5.1 |
| 31–32 | Bisphenol A | 10 | 5.0 | 28.9 | 6.6 |
| 33–34 | DMBPA | 10 | 5.0 | 37.8 | 11.3 |
| 35–36 | 4-isopropylphenol | 10 | 4.8 | 45.5 | 22.1 |
| 37–38 | 2-methoxy-4-methylphenol | 10 | 5.0 | 45.8 | 18.2 |

It should be noted that the performance of the hindered phenols may suggest that the preferred phenolic photostabilizers for methylene blue are those that are capable of close association of the phenolic hydroxyl group with the basic sites of methylene blue, or otherwise exist in an optimal configuration with methylene blue such that the methylene blue photoexcited state is quenched without destruction of the methylene blue chromophore.

EXAMPLES 39–44

The following samples were prepared similarly to the above-referenced samples except that the various DVD bonding adhesives used the following base formulation, wherein Part A includes SR238, SR495, SR440, Tinuvin 292, Irgacure 819 and, optionally, polyhydroxystyrene and/or resorcinol:

Part A:
10.01 g SR238 diacrylate (Sartomer; 1,6-hexanediol diacrylate)
15.15 g SR495 acrylate (Sartomer; caprolactone acrylate)
5.05 g SR440 acrylate (Sartomer; isooctyl acrylate)
0.117 g Tinuvin 292 (Ciba Geigy)
0.80 g Irgacure 819 (Ciba Geigy)
polyhydroxystyrene (ChemFirst; PHS-8E01)
resorcinol (Aldrich)

Part B:
0.7 g TIPSOCLMB
10.1 g SR339 acrylate (Sartomer; phenoxyethyl acrylate)

Part C:
2.0 g Sn(II) 2-ethylhexanoate (Aldrich)

In these examples, varying concentrations of polyhydroxystyrene and resorcinol were used, as indicated in the table below. In these examples, either colorless or red GE Lexan polycarbonate was used to mold the DVD substrates, as indicated in the table below.

EXAMPLES 57–59

Following samples were prepared similarly to the above-referenced samples except that the various DVD bonding adhesives used the following base formulation:

Part A:
7.49 g SR238 diacrylate (Sartomer; 1,6-hexanediol diacrylate)
20.03 g SR495 acrylate (Sartomer; caprolactone acrylate)
2.505 g SR440 acrylate (Sartomer; isooctyl acrylate)
0.46 g Tinuvin 292 (Ciba Geigy)
0.80 g Irgacure 819 (Ciba Geigy)
polyhydroxystyrene (ChemFirst; PHS-8E01)
2,4-dihydroxybenzoic acid Part B:
0.7 g TIPSOCLMB
10.0 g SR339 acrylate (Sartomer; phenoxyethyl acrylate)

TABLE 4

DVD Bonding Adhesives (Examples 39–44)

| | | | | Time in weather-o-meter | | | |
|---|---|---|---|---|---|---|---|
| | | | | colorless polycarbonate | | red polycarbonate | |
| Example | Wt % PHS | Wt % resorcinol | % Ref. after 0 hrs | % Ref. after 80 hrs | % Ref. after 176 hrs | % Ref. after 80 hrs | % Ref. after 176 hrs |
| 39–40 | 12 | 0 | 4.8 | 46.0 | 51.9 | 9.9 | 29.1 |
| 41–42 | 7 | 5 | 4.8 | 36.3 | 38.3 | 5.0 | 5.5 |
| 43–44 | 0 | 5 | 4.9 | 37.3 | 41.5 | 7.9 | 8.1 |

EXAMPLES 45–56

The following samples used a similar DVD bonding adhesive containing 12% PHS, with varying concentrations of stabilizers, as indicated in the table below. In these examples, either colorless or red GE Lexan polycarbonate was used to mold the DVD substrates, as indicated in the table below.

Part C:
2.0 g Sn(II) 2-ethylhexanoate (Aldrich)

These examples used bonding adhesives based on the above-referenced formulation, with varying concentrations of polyhydroxystyrene and 2,4-dihydroxybenzoic acid added to Part A of the bonding adhesive, as indicated in the table below. In these examples, red GE Lexan polycarbonate was used to mold the DVD substrates.

TABLE 5

DVD Bonding Adhesives (Examples 45–56)

| | | | Time in weather-o-meter | | | | |
|---|---|---|---|---|---|---|---|
| | | colorless polycarbonate | | | red polycarbonate | | |
| Example | Additive | % Ref. 0 hrs | % Ref. 86 hrs | % Ref. 157 hrs | % Ref. 0 hrs | % Ref. 86 hrs | % Ref. 157 hrs |
| 45–46 | None | 4.6 | 50.5 | | 3.2 | 20.2 | 30.9 |
| 47–48 | 1% resorcinol | 4.8 | 33.2 | 41.0 | 4.9 | 8.2 | 10.6 |
| 49–50 | 2% resorcinol | 4.8 | 28.0 | | 4.8 | 6.0 | 7.7 |
| 51–52 | 4% resorcinol | 4.8 | 21.1 | 29.0 | 5.1 | 5.6 | 6.1 |
| 53–54 | 4% 2,4-dihydroxybenzoic acid | 4.8 | 5.1 | 6.1 | 4.8 | 5.2 | 5.2 |
| 55–56 | 4% benzoic acid | 4.7 | 28.7 | | 4.9 | 14.5 | 19.7 |

TABLE 6

DVD Bonding Adhesives (Examples 57–59)

| Example | Wt % PHS | Wt % 2,4-dihydroxybenzoic acid | % Reflectivity after 0 hrs | % Reflectivity after 90 hrs | % Reflectivity after 162 hrs |
|---|---|---|---|---|---|
| | | | | Time in weather-o-meter | |
| 57 | 12 | 0 | 4.9 | 28.9 | 38.5 |
| 58 | 11.6 | 3.85 | 4.9 | 7.4 | 8.1 |
| 59 | 6 | 4 | 4.9 | 8.2 | 9.1 |

EXAMPLES 60–65

The following samples used DVD bonding adhesives containing 12% PHS, with varying concentrations of stabilizers added to Part A of the bonding adhesive, as indicated in the table below. In these examples, either colorless or red GE lexan polycarbonate was used to mold the DVD substrates, as indicated in the table below.

TABLE 7

DVD Bonding Adhesives (Examples 60–65)

| Example | Additive | colorless polycarbonate | | | red polycarbonate | | |
|---|---|---|---|---|---|---|---|
| | | % Ref. 0 hrs | % Ref. 67 hrs | % Ref. 140 hrs | % Ref. 0 hrs | % Ref. 67 hrs | % Ref. 140 hrs |
| 60–61 | None | 4.8 | 34.3 | 43.5 | 4.9 | 7.1 | 11.9 |
| 62–63 | 2% resorcinol | 4.8 | 17.7 | 29.2 | 4.9 | 5.1 | 5.6 |
| 64–65 | 2% hexyl resorcinol | 4.8 | 23.4 | 34.2 | 5.0 | 5.9 | 7.3 |

EXAMPLES 66–79

The following samples used DVD bonding adhesives containing 12% PHS, with varying concentrations of stabilizers added to Part A of the bonding adhesive, as indicated in the table below. In these examples, either colorless or red GE Lexan polycarbonate was used to mold the DVD substrates, as indicated in the table below.

TABLE 8

DVD Bonding Adhesives (Examples 66–79)

| Example | Additive | colorless polycarbonate | | red polycarbonate | | |
|---|---|---|---|---|---|---|
| | | % Ref. 0 hrs | % Ref. 89 hrs | % Ref. 0 hrs | % Ref. 67 hrs | % Ref. 186 hrs |
| 66–67 | None | 3.74 | 32.10 | 4.4 | 9.2 | 13.8 |
| 68–69 | 2% resorcinol | 3.47 | 15.39 | 4.5 | 5.5 | 4.0 |
| 70–71 | 2% 4-hexylresorcinol | 3.31 | 19.01 | 4.2 | 4.2 | 4.2 |
| 72–73 | 2% 5-methyl resorcinol | 2.88 | 23.12 | 4.5 | 6.0 | 5.9 |
| 74–75 | 2% resorcinol monoacetate | 3.55 | 30.37 | 4.5 | 8.7 | 13.9 |
| 76–77 | 2% 2,4-dihydroxybenzophenone | 4.06 | 46.89 | 4.5 | 10.7 | 16.8 |
| 78–79 | 2% 2,4,2',4'-tetrahydroxybenzophenone | 3.91 | 32.78 | 4.2 | 3.3 | 3.8 |

Finally, Table 9 summarizes the formulations of a number of exemplary reactive adhesives.

TABLE 9

Exemplary Reactive Adhesive Formulations

| SR351 | SR495 | SR440 | T292 | Irg819 | RS | PHS8 | TLMB | SR339 | Sn (II) |
|---|---|---|---|---|---|---|---|---|---|
| 21.1 | 42.3 | 0.0 | 0.2 | 1.7 | 0.0 | 10.5 | 1.6 | 18.6 | 4.0 |
| 21.3 | 42.6 | 0.0 | 0.2 | 1.7 | 10.0 | 0.0 | 1.6 | 18.6 | 4.0 |
| SR238 | SR495 | SR440 | T292 | Irg819 | RS | PHS8 | TLMB | SR339 | Sn (II) |
| 20.5 | 30.0 | 10.0 | 0.2 | 1.6 | 0.0 | 12.0 | 1.4 | 20.0 | 3.0 |
| 15.0 | 40.0 | 5.0 | 1.0 | 1.6 | 0.0 | 12.0 | 1.4 | 20.0 | 3.0 |
| 20.2 | 30.3 | 10.1 | 0.2 | 1.6 | 5.0 | 7.0 | 1.4 | 20.2 | 4.0 |
| 22.0 | 32.9 | 11.0 | 0.2 | 1.6 | 5.0 | 0.0 | 1.4 | 22.0 | 4.0 |
| 19.6 | 30.0 | 9.8 | 1.0 | 1.5 | 2.0 | 12.0 | 1.4 | 19.6 | 3.0 |
| 15.8 | 40.0 | 7.9 | 0.5 | 1.5 | 2.0 | 12.0 | 1.4 | 15.8 | 3.0 |
| 15.6 | 40.0 | 7.8 | 1.0 | 1.5 | 2.0 | 12.0 | 1.4 | 15.6 | 3.0 |
| 19.0 | 30.0 | 9.5 | 0.5 | 1.5 | 4.0 | 12.0 | 1.4 | 19.0 | 3.0 |
| 14.8 | 40.0 | 7.4 | 1.0 | 1.5 | 4.0 | 12.0 | 1.4 | 14.8 | 3.0 |

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A limited play data storage medium, comprising:
   at least one substrate;
   at least one of a reactive layer and a reactive adhesive layer disposed directly or indirectly adjacent to a surface of the substrate;
   wherein, if used, the reactive layer comprises at least one carrier material, at least one reactive material disposed within the at least one carrier material and at least one photo-bleaching retarder material disposed within the at least one carrier material;
   wherein, if used, the reactive adhesive layer comprises at least one adhesive material, at least one reactive material disposed within the at least one adhesive material and at least one photo-bleaching retarder material disposed within the at least one adhesive material; and
   wherein the at least one photo-bleaching retarder material comprises a polyhydroxy compound selected from the group consisting of resorcinol, 4-hexylresorcinol, chlororesorcinol, an oxidation product of resorcinol and 2,4-dihydrobenzoic acid.

2. The limited play data storage medium of claim 1, wherein the polyhydroxy compound is present in a range of between about 0 weight % and about 10 weight %, based upon the total weight of the reactive adhesive layer.

3. The limited play data storage medium of claim 2, wherein the polyhydroxy compound is present in a range of between about 2 weight % and about 5 weight %, based upon the total weight of the reactive adhesive layer.

4. The limited play data storage medium of claim 1, wherein the at least one photo-bleaching retarder material further comprises a polymeric polyhydroxy compound.

5. The limited play data storage medium of claim 4, wherein the at least one photo-bleaching retarder material further comprises polyhydroxystyrene.

6. The limited play data storage medium of claim 5, wherein the polyhydroxystyrene is present in a range of between about 0 weight % and about 12 weight %, based upon the total weight of the reactive adhesive layer.

7. The limited play data storage medium of claim 6, wherein the polyhydroxystyrene is present in a range of between about 7 weight % and about 12 weight %, based upon the total weight of the reactive adhesive layer.

8. The limited play data storage medium of claim 1, wherein the at least one photo-bleaching retarder material comprises a combination of the polyhydroxy compound and polyhydroxystyrene.

9. The limited play data storage medium of claim 8, wherein the at least one photo-bleaching retarder material comprises a combination of resorcinol and polyhydroxystyrene.

10. The limited play data storage medium of claim 8, wherein the at least one photo-bleaching retarder material comprises a combination of 4-hexylresorcinol and polyhydroxystyrene.

11. The limited play data storage medium of claim 1, wherein the at least one reactive material comprises a reactive material selected from the group consisting of oxygen sensitive leuco methylene blue, a reduced form of methylene blue, a reduced form of brilliant cresyl blue, a reduced form of basic blue 3, a reduced form of toluidine 0, a derivative of one of the foregoing reactive materials and a combination comprising at least one of the foregoing reactive materials.

12. The limited play data storage medium of claim 1, wherein the at least one adhesive material comprises an adhesive material selected from the group consisting of UV-curable acrylates, methacrylates, urethanes, epoxies, vinyl monomers and combinations comprising at least one of the foregoing adhesive materials.

13. The limited play data storage medium of claim 1, wherein the at least one carrier material comprises a carrier material selected from the group consisting of thermoplastic acrylic polymers, polyester resins, epoxy resins, polythiolenes, UV-curable organic resins, polyurethanes, thermosettable acrylic polymers, alkyds, vinyl resins and reaction products and combinations comprising at least one of the foregoing carrier materials.

14. The limited play data storage medium of claim 1, wherein the at least one substrate comprises a substrate selected from the group consisting of polyvinyl chloride, polyolefins, polyesters, polyamides, polysulfones, polyimides, polyether imides, polyether sulfones, polyphenylene sulfides, polyether ketones, polyether ether keytones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride and tetrafluoroethylenes.

15. The limited play data storage medium of claim 1, wherein the at least one substrate comprises at least one substantially colorless substrate.

16. The limited play data storage medium of claim 1, wherein the at least one substrate comprises at least one substantially red-colored substrate.

* * * * *